United States Patent [19]
Favreau et al.

[11] Patent Number: 4,841,943
[45] Date of Patent: Jun. 27, 1989

[54] GASOLINE SUPERHEATER

[76] Inventors: Danny W. Favreau, 3560 N. Terrace Cir., McConnelsville, Ohio 43756; Clen H. Furr, 1504 20th St., Vienna, W. Va. 26105

[21] Appl. No.: 82,290

[22] Filed: Aug. 6, 1987

[51] Int. Cl.$^4$ .................... F02M 31/00; F02M 31/10
[52] U.S. Cl. .................................... 123/557; 417/209
[58] Field of Search ............... 123/557, 558; 417/207, 417/209

[56] References Cited

U.S. PATENT DOCUMENTS

| | | | |
|---|---|---|---|
| 3,110,296 | 11/1963 | Lundi | 123/557 |
| 4,083,340 | 4/1978 | Furr et al. | 123/557 |
| 4,527,533 | 7/1985 | Laramee | 123/557 |
| 4,625,790 | 12/1986 | Okayasu | 417/209 |

Primary Examiner—Willis R. Wolfe
Assistant Examiner—M. Macy
Attorney, Agent, or Firm—Mueller and Smith

[57] ABSTRACT

The improved gasoline superheater is a device designed for the purpose of improving the efficiency and cleanliness of the internal combustion engine. It is a device designed in a manner to be coupled to an internal combustion engine and operated automatically without modification to the engine or any of its anti-pollution devices. The improved gasoline superheater consists of a container or canister which is sealed and contains a copper or metallic heating coil which may be connected in communication with the cooling system of the engine, so as to heat gasoline admitted through an opening in the chamber from the fuel tank commonly found on an automobile after being put under pressure by the fuel pump. Said gasoline superheating device is capable of heating gasoline to a predetermined set point as controlled by an electronic device, which set point is above the ambient pressure boiling point of gasoline, but maintaining it in a liquid state by holding it under pressure.

6 Claims, 2 Drawing Sheets

GASOLINE SUPERHEATER

BACKGROUND OF THE INVENTION

1. The Field

This invention is directed to the area of heating gasoline for an internal combustion engine above its ambient pressure boiling point and maintaining it in a liquid state under pressure. When the gasoline is so heated and delivered as a liquid to a commonly known carburetor, throttle body injector, port fuel injection system, or other fuel delivery system to an internal combustion engine, the superheated gasoline tends to vaporize instantly when introduced into the intake manifold of the engine, becoming a more finely divided particulate of gasoline molecules, which provide extra surface for combustion, resulting in more complete burning of gasoline. The more complete burning of fuel results in lower emissions and better fuel mileage.

2. Prior Art

Many devices exist for the purpose of heating gasoline or diesel fuel to attempt to achieve more efficient burning in an internal combustion engine. The following devices have been found to be heating devices:

| U.S. Patents | | | |
|---|---|---|---|
| 3,699,938 | Frazier | | |
| 3,253,647 | Deshaies | | |
| 3,354,872 | Gratzmuller | | |
| 1,300,600 | Giesler | | |
| 1,318,068 | Giesler | | |
| 1,227,530 | Davis | | |
| 961,152 | Morse | | |
| 3,378,063 | Mefferd | | |
| 3,001,519 | Dietrich, et al | | |
| 1,384,512 | Buchi | | |
| 1,266,429 | D'Orville | | |
| 2,528,081 | Rodnesky | | |
| 916,003 | Osborn, | | |
| 990,741 | Jacobs | | |
| 2,390,979 | Young | | |
| 3,118,496 | Vandenbosch | | |
| 2,231,525 | Breitling | | |
| 4,083.340 | Furr, et al | | |
| Foreign Patents | | | |
| French | April, 1939 | Quellet | 840,643 |
| Great Britain | Jan., 1925 | Tartrais | 212,902 |
| Austria | Nov., 1959 | Rassbohrer | 209,774 |

The following patent deals with superheated fuel delivery to an internal combustion engine, wherein the fuel is heated above its ambient temperature boiling point and maintained in a liquid state under pressure:

U.S. Pat. No. 4,083,340; Apr. 11, 1978; C. H. Furr, et al

SUMMARY OF THE INVENTION

This invention deals with the art of superheating fuel for combustion in an internal combustion engine. In the superheating process, fuel is pumped from the fuel tank on an automobile engine through the fuel pump into the superheating chamber where it is heated above its ambient pressure boiling point, but retained as a liquid by the pressure developed in the fuel pump. This superheated fuel mixture is then delivered to the induction system of an internal combustion engine where it is introduced into the engine in a state more conducive to combustion. The preferred embodiment of this invention consists of a heating coil or heating device, submerged in a cylinder or chamber of other configuration, whereby hot coolant from the engine cooling system can pass through the heating coil or other device being utilized as a heat exchanger to heat the gasoline above its ambient temperature boiling point while retaining it as a liquid under pressure.

The pressure is developed by the action of the fuel pump which is utilized in pumping fuel from the fuel tank to the carburetor or injection system on a modern automobile engine. Fuel pressures may vary depending upon the type of fuel system utilized and the device is designed to work at any normal range of fuel pressure found on different models of modern automobiles from 1½ to 50 pounds.

The gasoline enters the heating chamber at the bottom of the chamber through a one way spring loaded ball check valve and rises in the chamber striking baffle plates that are positioned alternately in the heating coil so as to cause the fuel to be agitated and turned as it is being heated. This results in uniform heating of fuel and prevents overheating and possible boiling of the potentially volatile mixture. As the fuel travels through the coil in the container toward the top of the container, it is removed from the container by a dip tube which protrudes into the cylinder near the top of the top baffle plate. This dip tube contains uniquely designed holes at the top to eliminate any vaporization that might occur in the superheating chamber from excessive heat, causing the fuel to be raised above its boiling temperature in hot spots along the heating coil. The liquid superheated fuel exits the dip tube through a spring loaded ball check valve and proceeds to the carbureator or fuel injection system after it has been heated to a predetermined temperature by a temperature sensing device located in the top of the superheater near the entrance of the dip tube.

The temperature sensing device allows the fuel in the superheater to be heated to a preset ambient temperature in excess of its normal ambient pressure boiling point. The temperature sensor is connected electrically to a valve situated in the water inland line and is further connected electrically through an operating switch to a power source and ground. When the temperature sensing device determines that the fuel temperature is beginning to drop, it causes an electrical signal to be sent to the valve located in the line to the inlet of the heating coil and opens the valve. This allows warm engine coolant from the engine to flow through the heating coil at a predetermined rate as established by a calibrated orifice inserted into the heating coil inlet. This calibrated orifice allows hot engine coolant into the heating coil in metered amounts so as to permit the gentle heating of the fuel in the superheater to a point above its ambient pressure boiling point without a rapid heating effect which might form hot spots in the heating coil and causing boiling, which would override the action of the fuel pump and stop the flow of fuel into the engine.

The dip tube by which the superheating fuel exits the superheater on its way to being conducted to the carburetor or fuel injection system is positioned above the top baffle plate so as to pick up the completely agitated fuel which rises through the superheater after striking the baffle plates which are set at an angle approximately three degrees from the horizontal. The top of the dip tube at the point where the dip tube exits the chamber, contains four tiny holes drilled at a 45° angle from the horizontal in an upward direction from outside to the inside of the tube. During the operation of the superheater on tempered glass models that have been constructed, it has been noted that minute bubbles form on hot spots along the heating coil and collect in the top of the superheater. The unique installation of these holes at the top of the dip tube, together with the temperature sensing device and calibrated orifice limit to a bare minimum, the formation of these bubbles and present a medium for their evacuation from the heating chamber to be burned in the engine after delivery to the carburetor or fuel injection system. The existence of these uniquely designed holes in the dip tube and the delicate balance of temperature sensor and calibrated orifice, has eliminated the requirement for any conduit in this device to return excess fuel and bubbles to the fuel tank.

After the superheated fuel leaves the superheater and is conducted to the engine, the fuel is burned in the engine after being mixed with air by the carburetor or fuel injection system. In the instance of a carburetor, the hot superheated fuel enters the carburetor passing the needle valve to the float bowl of the carburetor chamber where the pressure that has been holding it in a liquid state is removed and it tends to boil or vaporize. This vapor is sucked into the intake manifold of the carburetor through a porting and venting system in the carberetor bowl that are connected in communication with the intake manifold. Further, liquid gasoline remaining in the bowl is sucked into he venturi of the carburetor by the venturi principle. This gasoline is mixed with air introduced through the main bleeds and when the gasoline actually enters the intake manifold and experiences the negative pressure in the intake manifold caused by the pistons of the engine moving down to charge the cylinders, the gasoline tends to vaporize and become more finely divided. This introduces a more evenly mixed air-fuel mixture into each cylinder which burns cleanly and more efficiently since the finer divided particles present more of a burning surface per unit volume than larger droplets would present. This burning results in more efficient burning of gasoline in a normally aspirated or carburated engine which results in better gas mileage and cleaner emissions. In the instance of a fuel injection system, the superheated fuel, after leaving the superheater, is conducted to the injectors still under pressure of the fuel pump. When it reaches the injectors, it is injected in an atomized spray into the intake manifold either at a throttle body injector site or at points near the intake valves on a multi port injection system. When the superheated fuel that is above its ambient pressure boiling point is introduced into the negative pressure of the intake manifold at the throttle body injector or at the entry port on multi port injection systems, it also tends to vaporize into more finely divided particles which are more susceptible to complete burning when ignited in the engine. The complete burning of the fuel cuts down on emissions and increases gas mileage. Further, the introduction of the fuel into a metal container, containing hot copper, brass, aluminum, steel and stainless steel parts, tends to "sour" the gasoline and cause the formation of highly reactive hydrogen oxygen molecules called hydroperoxide. The highly reactive hydrogen and oxygen combinations tend to burn also. The function of the improved calibrated gasoline superheater allows efficient burning of fuel in an internal combustion engine which results in better gasoline mileage and reduced emissions.

BRIEF DESCRIPTION OF THE DRAWING

FIG. One is a perspective view of the improved gasoline superheater installed in connection with the component fuel and cooling parts of an ordinarily known gasoline engine. Solid lines represent the superheater and broken lines represent existing components.

FIG. Two is an exploded view of the superheater chamber showing the heating coil with the coil spread for clarity, the dip tube temperature sensing device, calibrated orifice and check valve.

DETAILED DESCRIPTION OF THE PREFERRED EMBODIMENT

Figure 1:
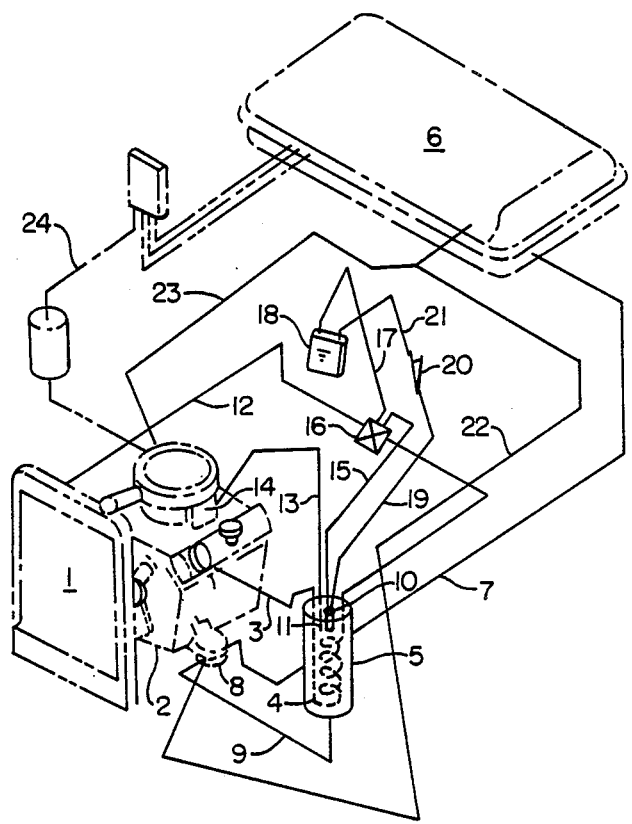
Figure 2:
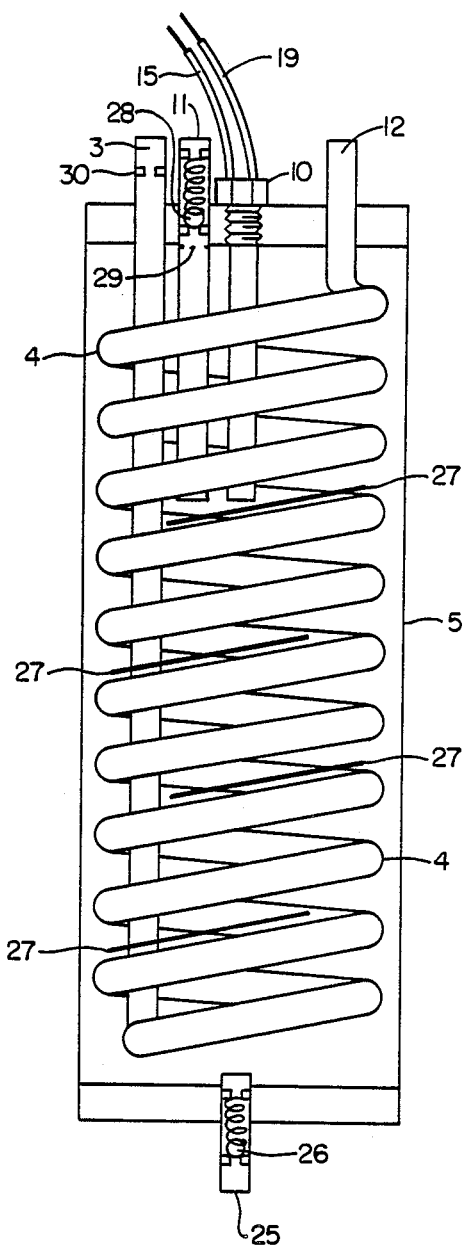

FIG. One shows an illustration of the improved gasoline superheater connected to a normal engine. The superheater shown as No. 5 contains an internal heating coil (4) connected to a gasoline engine (2) by an inlet coolant line (3) and an exit cooling line (12). The device is located behind but away from the radiator (1) so as to not pick up latent heat. The device is further connected to fuel tank (6) by virtue of a fuel line (7) to the fuel pump (8) and by a fuel line (9) to the bottom of the superheater itself. Superheated fuel exits through the dip tube (11) and a fuel line (13) to the carburetor or fuel injection system (14). A temperature sensor (10) is connected electrically by a wire (15) to a valve (16) in line (12) as shown here or preferably to the inlet line (3). The valve (16) is further connected by a line (17) to a battery (18). The circuit is made complete by an electrical line (19) coming from the sensor (10) to a switch (20) which attaches to a line (21) that is connected to the battery. On some automobiles, a return line (22) exists between the fuel pump (8) and the fuel tank (6) to allow excess fuel not utilized by the system to return to the fuel tank. On fuel injection systems, a return line (23) from the fuel injection system (14) to the fuel tank (6) also exists. The charcoal canister (24) and vapor system and its associated lines exist on all modern automobiles. As fuel leaves the gas tank (6), and passes through line (7) to the fuel pump (8), it is pressurized by the pump and delivered through line (9) to the superheater (5) where it is then heated under pressure to a temperature above its ambient pressure boiling point. It is there delivered to the carburetor or injection system (14) by line (13) for burning in the engine. The value (16) controls the amount of heat injected into the heating coil (4) as determined by the sensor (10). When the switch (20) is closed, the circuit is energized and heat is provided to the chamber by the coolant lines (3) and (12) as required by the valve (16). Referring to FIG. Two, pressurized ambient temperature gasoline is introduced into the superheating chamber at the connection (25) through a spring loaded ball check valve (26). This valve prevents the flow of hot high pressure superheated gasoline from the superheater chamber into the fuel pump when the engine is not operating and maintains the superheater liquid full. The pressurized cold gasoline rises through the copper heating coil (4) and is swirled or agitated by the action of the baffle plates (27) as it proceeds through the coil (4) toward the top of the superheater. The hot collant enters the superheater coil through an opening (3) past the calibrated orifice (30) which regulates the flow and is designed to prevent heating of the copper parts of the heating coil and the coolant exits through conduit (12) at the other end of the coil after heating the fuel. The fuel in the superheater is heated to a predetermined temperature as governed by the sensor (10)

which sends an electrical signal via the electrical conduits (15) and (19) to the valve (16) to allow further heat flow as required. When the superheated fuel reaches its predetermined temperature of between 110° and 225° F. depending upon the application, the device is in equilibrium and continues to operate automatically by virtue of the action of the sensor (10) and the calibrated orifice (30). Superheated fuel is passed through the dip tube (11) to the carburetor or injection system. In passing through the dip tube (11), the superheated fuel goes through a spring loaded ball check valve (28) which prevents siphoning of fuel after the device is out of service when the engine is shut off. The uniquely positioned holes (29) in the dip tube (11) are drilled at a 45° angle upward from the outside of the tube toward the inside and are situated at the top of the aluminum superheater canister (5). These holes (29) allow the removal of tiny bubbles of air that form along the heating coil (4) during the heating process. These bubbles tend to form on hot spots along the copper heating coil (4) and brass or copper baffle plates (27). After long periods of use, an air pocket tends to form at the top of the superheater (5) which inhibits the heating action of the superheater by displacing fuel from the superheater (5) and lessening the surface area of the coil (4) that comes in contact with it. The unique design and placement of these bleed holes (29) allow the evacuation of air bubbles that build up through prolonged operation and insure that the superheater (5) remains liquid fuel. The installation of these internal bleed holes (29) have eliminated the necessity of a separate conduit to recycle excess fuel and air bubbles to a heating exchanger and the fuel tank. It is recognized that this superheater may be operated by the use of hot exhaust or by electrical heating methods.

This device has been designed to operate on superheated gasoline at temperatures above its ambient pressure boiling point of 100° F. This device operates through the spectrum of 100° F. to a maximum of 235° F. which is the maximum cooling temperature of a modern automobile. This device has been designed to be added to a modern automobile without the removal of any fuel system components or pollution control devices. It is recognized that certain pollution control devises could be removed from the modern automobiles without rendering the device inoperable. This device has, however, been designed in light of modern emission requirements to operate in conjunction with all pollution control devices on modern automobiles.

This device has been tested in actual operation in excess of 500,000 miles of road test in urban and rural driving conditons on approximately 15 different types of automobiles. These automobiles were carefully selected so that all commonly used fuel systems could be tested using this device. It has been determined that this device functions properly on vehicles equipped with a normally aspirated engine utilizing a commonly known carburetor, a throttle body injector system of Ford, General Motors, or Chrysler design, and on multi port fuel injection systems.

Test results have shown that fuel economy increases with the use of this device although the economy does not increase as dramatically on cars equipped with emission control devices as it does on older cars prior to the installation of catalytic convertors and other pollution control devices by original equipment manufacturers. It has been discovered however, that this device, when utilized on an automobile equipped with modern pollution control devices, drastically reduces the emission level of hydrocarbons, carbon monoxide and NOX emissions.

This device has recently been installed on a 1987 Buick Estate Wagon with a gross vehicle weight of 6,005 pounds. This vehicle has a five liter General Motors engine (Oldsmobile) and is equipped with a Rochester quadrojet carburetor. This vehicle was driven at speeds between 70 to 75 mph along the Interstate 95 from Petersburg, Va. south of Florence, S.C., and then across South Carolina 501 to Myrtle Beach, S.C., with four passengers and a week's luggage. This vehicle averages in excess of 21 miles per gallon. The same vehicle traveling on Interstate 77 from Columbia, S.C. to Princeton, W. Va. at speeds between 75 and 80 mph averaged in excess of 19 miles per gallon. Prior to the installation of this device, in normal driving, this vehicle averaged approximately 17 miles per gallon.

Dynamometer tests conducted at a nationally known independent testing laboratory on a General Motors vehicle with a 305 cubic inch engine at a 30 mph steady state test reveal hydrocarbon emissions of 0.06 grams per mile, carbon monoxide emissions of 0.00 grams per mile, and NOX emissions of 0.34 grams per mile. These levels are much less than the federally mandated maximum emission levels of hydrocarbons 0.41 grams per mile, carbon monoxide 3.4 grams per mile, and NOX 1.0 grams per mile.

It has been noted in operating the test vehicles in excess of 500,000 miles, that the engines on the vehicles tend to run much smoother. It has been further visually noted that the crankcase oil in the test vehicles tends to remain cleaner for a longer period of time. This can be attributed to the complete burning of the hydrocarbon fuel in the combustion chamber.

We have utilized this device on four, six and eight cylinder engines of various manufacturers with various fuel systems. We have found the device to function properly on these cars.

We claim:

1. In combination, an internal combustion engine and a gasoline superheating device comprised of a sealed chamber with an inlet in communication with a fuel pump, said inlet allowing the delivery of pressurized ambient temperature gasoline through a spring loaded check valve into a superheating chamber where said gasoline is heated by the action of a coil, and a dip tube device for the removal of said gasoline superheated above its ambient pressure boiling point and maintained liquid under pressure by action of the fuel pump, said dip tube device having uniquely positioned air bleed holes to allow the removal of tiny bubbles forming inside the superheater chamber from the superheater chamber to a conduit for delivery to a carburetor or fuel injection device, said superheater chamber being heated to a predetermined temperature between 100° F. and 235° F., said temperature being regulated by a calibrated orifice in the heating coil and an electronic sensing device, electrically connected to and serving as an actuator for a valve in combination with the hot liquid coolant line which controls the amount of liquid coolant fed to the superheater.

2. The structure of claim 1 in which baffle plates are contained in said superheating device wherein the dip tube device and electronic sensing device extend into the superheating device to a position immediately above the top baffle plate.

3. The structure of claim 1 in which the electronic sensing device and dip tube device and electronic sensing device extend into the gasoline heating chamber the same distance.

4. In combination, the gasoline superheating device in an internal combustion engine, said superheating device comprising a sealed heating chamber, which contains a means comprised of a copper heating coil with copper or brass baffles in a steel, aluminum or copper case, said coil containing a calibrated orifice to restrict the flow of coolant to a predetermined amount from said internal combustion engine, and an actuator valve being operated by a temperature sensing device within said superheated chamber, said chamber being capable of superheating liquid gasoline to a heat from between 100° F. and 235° F. which is above the normal ambient pressure boiling point at normal atmospheric pressure, said chamber having an opening for the entry through a check valve for the entry of ambient temperature gasoline and dip tube for an exit through a check valve of superheated gaslone and openings for the entrance and exit of hot liquid coolant into, through and out of the superheating coil and a means for maintaining said gasoline in said heating chamber under sufficient pressure to keep it in a liquid state even though it is heated above its ambient pressure boiling point and said actuator valve operated by said temperature sensing device maintaining a constant predetermined temperature which is between 100° F. and 235° F. and a means to evauate small bubbles through air bleed holes in said dip tube and a means to supply heated liquid coolant to the coil to heat said heating chamber.

5. The structure of claim 4 in which the dip tube and temperature sensing device extend into the superheater to a position immediately above the top baffle.

6. The structure of claim 4 in which the temperature sensing device and dip tube extend into the gasoline heating chamber the same distance.

* * * * *